March 18, 1958  J. H. NICHOLAS  2,827,506
CABLE SHEATH INSULATOR AND MOUNTING THEREFOR
Filed March 31, 1955
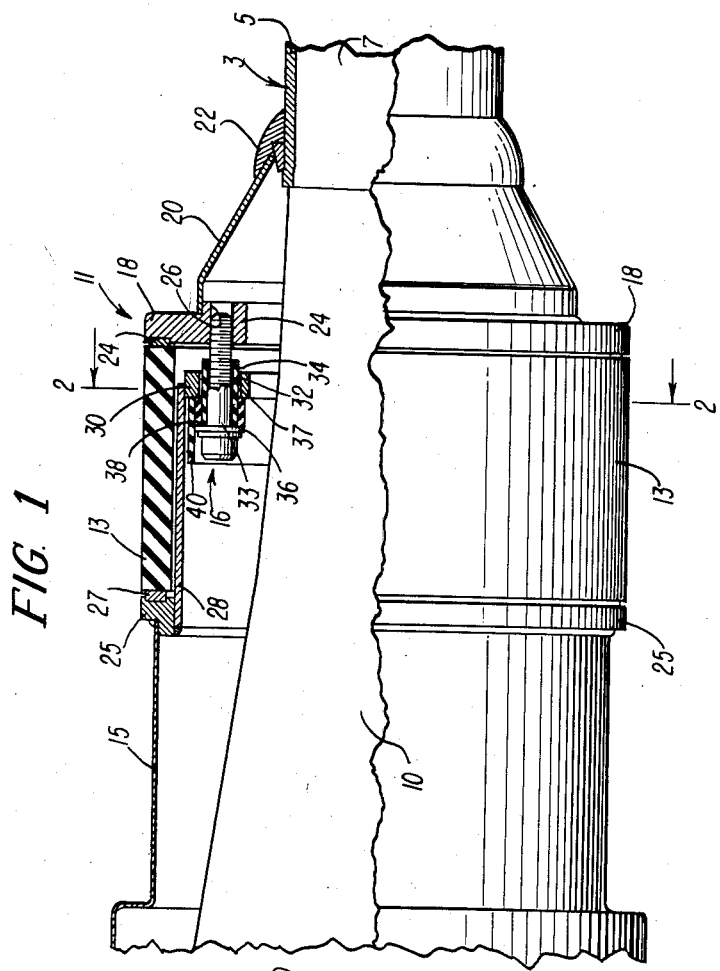
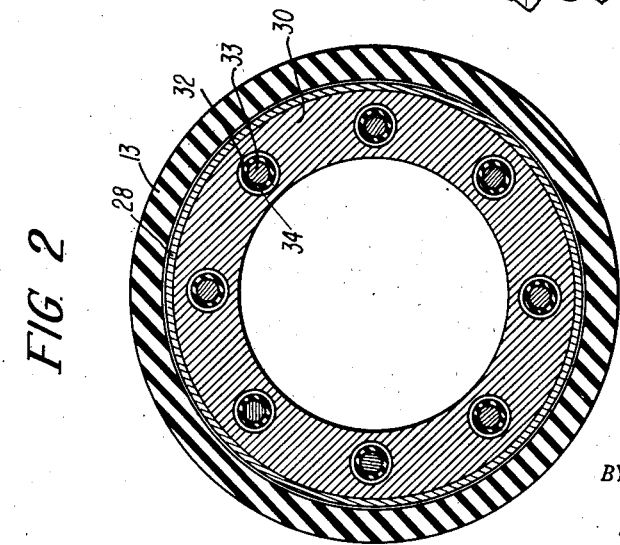
INVENTOR.
James H. Nicholas
BY
Atty

United States Patent Office 2,827,506
Patented Mar. 18, 1958

2,827,506

CABLE SHEATH INSULATOR AND MOUNTING THEREFOR

James H. Nicholas, Chicago, Ill., assignor to G. & W. Electric Specialty Company, Chicago, Ill., a corporation of Illinois Application March 31, 1955, Serial No. 498,292

7 Claims. (Cl. 174—21)

This invention relates to high voltage cables, and more particularly to insulating joints therefor.

In a single conductor high voltage metal sheathed cable considerable currents or voltages may be induced in the sheath. These may be reduced by interrupting the electrical continuity of the sheath at spaced lengths. For this purpose insulating sheath sections or members are used which, for convenience, are generally located at or adjacent to cable joints.

High voltage cables usually contain an insulating gas or liquid, frequently under pressure, so that it is necessary to provide a fluid-tight joint between the aforementioned insulating members and the adjacent conductive sheath portions of the high voltage cable. It is one of the objects of this invention to provide a clamping assembly for forcing the ends of spaced apart conductive sheath portions of a high voltage cable system into fluid-tight sealing relationship with the insulating members, to prevent leakage of insulating fluid from within the cable sheath, and which is completely sheltered from the deleterious elements outside of the cable.

It is a further object of this invention to provide a clamping assembly as above described which includes conductive force-applying parts and insulating parts immersed within the insulating fluid of the cable to minimize the size of the insulating joint.

These and other objects, advantages and features of the invention will become apparent upon making reference to the following specification taken in conjunction with the accompanying drawings wherein:

Fig. 1 is a view of a portion of a high voltage cable, partially in section and partially in elevation, which incorporates the novel insulating assembly of the invention; and Fig. 2 is a transverse section taken along the line 2—2 of Fig. 1, with the internal cable conductor assembly omitted.

Reference may now be had to the drawings where like reference numerals indicate like elements throughout.

The drawings show a high voltage single conductor oil filled cable section 3, wherein the oil is maintained under pressure. The cable 3 has a cylindrical metal sheath 5 surrounding a single conductor high voltage cable conductor assembly 7 shown in outline form. The cable conductor assembly may be of a conventional construction which usually includes a central passageway which contains an insulating gas or fluid, a surrounding multi-strand cable conductor, and suitable wrapped insulation surrounding the cable conductor.

Connected to and extending coaxially from the end of the cable sheath 5 is an insulating joint assembly 11. The joint 11 is a mechanical coupling joining the cable sheath 5 with the housing of a cable joint on the left. The insulating joint includes a tubular, cylindrical insulating sleeve 13 between metallic rings 18 and 25. Compressible sealing ring gaskets 24 and 27 are maintained under compression between the ends of the insulating sleeve and the ring members by a clamping assembly 16 within the sleeve. The left hand ring 25 is welded, soldered or brazed to a cylindrical metal shell 15 which joins suitable coupling parts at the left end portion of Fig. 1 (not shown), which make connection with other coupling parts on the end of a cable section to which the cable section 3 is connected. These coupling parts may be any suitable, well known construction, for instance, a well known joint between successive lengths of high voltage single conductor oil filled cables.

The right hand ring 18 is welded, soldered or brazed to a frusto-conical metal part 20 which in turn is soldered by a wiped solder joint 22 to the metal sheath 5 of the cable section 3. The entire insulating and coupling assembly 11 forms a fluid-tight extension of the cable sheath 5 and surrounds the joint insulation of the inner conductor assembly 7. The joint insulation 10 is built up to form a stress control cone or a continuation of the cable shielding in the well known manner. Insulating fluid within the cable assembly fills the space between the cable and joint insulation 10 and the insulating and coupling assembly 11.

In accordance with the invention, the clamping assembly 16 includes a metallic cylinder 28 welded to the inner surface of the ring member 25. The cylinder 28 extends adjacent to and along a substantial portion of the length of the inner surface of the insulating sleeve 13. A metallic ring 30 is welded or otherwise secured within the opposite end of the cylinder 28 to form an internal flange which is spaced from the radially innermost portion of the ring flange member 18. The metal ring 30 is formed with a number of circumferentially spaced unthreaded holes 32 which are in axial alignment with respective threaded holes 26 formed in the ring 18.

The rings 18 and 30 are drawn together by a number of metal, headed screws 33, the threaded shanks of which pass freely through the unthreaded holes 32 in the ring member 30 and thread into the threaded holes 26 of the ring flange member 18. Surrounding each of the screw shanks is an insulating sleeve 34 which insulates the metal screw shank from the metal of the ring 30 defining the walls of the holes 32. The left hand end of each of the sleeves 34 extends into abutment with a metal washer 36 against which the head of the screw bears. Fitted closely around each of the insulating sleeves 34 is a cylindrical insulating sleeve 38 which extends between the associated washer 36 and the adjacent axial face of the ring 30. By threading the respective screws 33 tightly within the threaded holes 26, the head of each screw bears against the washer 36 and forces the insulating sleeve 38 against the ring 30 which in turn forces the ring 25 toward the insulating sleeve 13 to compress the gaskets 27 and 24 at the ends of the insulating member 13 thereby forming fluidtight seals.

The metal screw heads are surrounded by a cylindrical insulating ring 40 which fits over the outer surfaces of all of the insulating sleeves 38 making a friction fit therewith and abuts the axial face of the ring 30.

The axial lengths of the insulating sleeves 34 and 38 are determined by the voltages to be insulated against. These lengths are substantially less than the lengths required for proper insulation if they were exposed to the atmosphere or to the elements outside of the cable as is the cylindrical insulating member 13. Thus, by mounting the clamping assembly 16 within the cable, the clamping assembly is made more compact, and exposure to corrosion-producing elements, such as moisture, is prevented.

In the cable sheath insulating section here shown, the sleeve 13 is of a length sufficient to inhibit current flow axially of the sheath under the conditions that prevail on the outside of the sheath. The length is such that the current flow is substantially inhibited notwithstanding any conductive film of water or other foreign matter that may form on the outside of the insulating sleeve 13. Because of the possibilities of formation of such a conductive film on the outside of the sleeve 13, it is necessary that the sleeve be for considerable length. On the inside of the sleeve there is a complete absence of moisture and complete protection against conductive contamination. For that reason, only a small amount of insulation is required on the inside of the sleeve 13 to provide the necessary insulation against the flow of current between the rings 18 and 25. The insulating sleeves 34, 38 and 40 provide that insulation. It is to be noted that the insulating sleeve 38 provides a longer path of insulation in a direction axially of the cable sheath from the ring 30 to the head of the screws 33 than the length of the path radially from the ring 30 to the shank of the screw 33. The longer path in a direction axially is necessary because the insulating properties are not as great in an axial direction along the surface of the insulating sleeve 38 as they are in a radial direction through the sleeves 38 and 34.

It is further to be noted that upon tightening of the screws 33 the insulating sleeve 13 and the insulating sleeve 38 are placed under compression, not under tension, all of the tension being taken by the metal member. This is desirable because the insulating materials involved, especially insulating sleeve 13 which may be porcelain, are generally much stronger in compression than in tension. In the assembly here shown, the ring 40 provides insulation in a radial direction between the conducting cylinder 28 and the heads of the screws 33, although it may be unnecessary because the oil and space may form suitable insulation.

If desired the insulating joint may comprise a factory fabricated unit including the metal shell 15, the ring 25 soldered thereto, the cylinder 28 soldered on the inside of the ring, the ring 30 soldered or welded to the cylinder 28, the gasket 27, insulating sleeve 13, gasket 24, ring 18, screws 33, insulating sleeves 34, 38 and 40, and the frustoconical tapered member 20, all assembled as shown in Fig. 1. In installing this joint the end of the sheath 5 of the cable is first removed to bare the necessary length of the cable conductor and its associated insulation. The pre-assembled insulating sheath joint above mentioned is then slipped over the end of the insulated cable conductor and slipped over the sheath 5 in a direction to the right as seen in Fig. 1, to allow the operator to install the necessary connector and insulation between the opposite ends of the sheath and the insulated conductor, and to build up the necessary stress control insulation and shielding over the end of the cable insulation, as indicated at 10. The insulating sleeve assembly of Fig. 1 may then be shifted on the cable to the left, to bring it to the position illustrated in Fig. 1, and the wiped sealing joint 22 may then be formed in the usual manner.

In compliance with the requirements of the patent statutes I have here shown and described a preferred embodiment of my invention. It is, however, to be understood that the invention is not limited to the precise construction here shown, the same being merely illustrative of the principles of the invention. What I consider new and desire to secure by Letters Patent is:

1. An insulating joint for joining and insulating the sheaths of two electric cable sections, said joint including an insulating sleeve and a pair of spaced conductive members on opposite ends of the sleeve connecting said joint between said electric cable section sheaths and forming a continuation of the sheaths, and clamping means within the joint for forcing said conducting members toward one another and toward the ends of the insulating sleeve comprising conductive tension members within the joint connected one to one of said conducting members and another to the other of said conducting members, and unexposed means encased within the insulating sleeve insulating the tension members from one another.

2. An insulating joint for joining and insulating the sheaths of two electric cable sections, said joint including an insulating sleeve and a pair of spaced conductive members on opposite ends of the sleeve connecting said joint between said electric cable section sheaths and forming a continuation of the sheaths, and clamping means within the joint for forcing said conducting members toward one another and toward the ends of the insulating sleeve comprising conductive tension members within the joint connected one to one of said conducting members and another to the other of said conducting members and unexposed means encased within the insulating sleeve insulating the tension members from one another, said tension members being spaced from one another and overlapping one another in a direction axially of the sleeve, and said means that insulates the tension members including electrical insulation between the overlapped parts of the tension members and compressed thereby in a direction axially of the insulating sleeve.

3. An insulating joint for joining and insulating the sheaths of two electric cable sections, said joint including an insulating sleeve, a par of hollow conductive means between which the insulating sleeve is disposed, one of said hollow conductive means having an end sized to make connection with the end of a cable section sheath, the other hollow conductive means to be connected with the sheath of another cable section, and clamping means within the coupling joint assembly for drawing said hollow conductive means toward one another and toward the ends of the insulating sleeve comprising a conductive tension member connected to one of said hollow conductive means and extending within said insulating sleeve to a point spaced from the other hollow conductive means a small distance relative to the length of said sleeve, another conductive tension member constituting a force-applying means connected to one of said first-mentioned tension members and said other hollow conductive means for drawing the hollow conductive means toward one another to sandwich said insulating sleeve therebetween, and unexposed solid insulating means encased within the joint and sandwiched between said second-mentioned force-applying tension member and the conductive portion of the joint to which the second-mentioned tension member is connected, for insulating the force-applying tension member from the latter portion of the joint.

4. An insulating joint for electric power cable sheaths comprising spaced hollow conductive members, tubular solid insulating means interposed between said spaced conductive members and forming an insulating closure therebetween, means within the joint for drawing said spaced conductive members toward one another, said last-mentioned means including conductive means secured to one of said conductive members and extending within the joint, separate conductive means on the other conductive member extending within the joint, conductive force-applying means attached to one of said conductive means within the joint, and unexposed means encased within the joint for insulating said force-applying means from said other conductive means including solid insulation interposed between the force-applying means and said other conductive means within the joint, said force-applying means bearing against said latter solid insulation to draw said respective conductive means toward one another, and the axial length of said tubular insulating closure being substantially greater than the axial length of said solid insulation within the insulating closure.

5. In an insulating joint assembly for electric power cables having spaced hollow conductive members adapted to be joined to the sheaths of a pair of electric insulating fluid containing cable sections and be in communication with the insulating fluid carrying portions thereof, and solid insulating means interposed between said hollow conductive members and forming an insulating closure therebetween, the improvement comprising means within the joint for drawing said hollow conductive members toward one another and toward the ends of said insulating closure, said last-mentioned means including a conductive extension on one of said hollow conductive members and extending within the joint, a conductive extension on the other hollow conductive member extending within the joint, unexposed solid insulation encased within said joint, and immersed within the insulating fluid, one end of said solid insulation bearing on the side of one of said conductive extensions which faces away from said other conductive extension, and conductive force-applying means bearing against the other end of said last-mentioned solid insulation and connected to the other conductive extension for forcing said solid insulation against said one conductive extension to, in turn, force the hollow conductive member connected with the latter extension toward the other hollow conductive member.

6. In a high voltage cable having a conductive sheath and an inner cable conductor assembly immersed in insulating fluid, solid insulating means interposed in the cable sheath to break the cable sheath into insulated cable sheath sections, and clamping means immersed within the cable insulating fluid for drawing said spaced sheath portions toward said solid insulating means.

7. In a high voltage cable having a conductive sheath and an inner cable conductor assembly immersed in insulating fluid, solid insulating means interposed in the conductive cable sheath to break the electrical continuity of the cable sheath, and clamping means immersed within the cable insulating fluid for drawing said spaced sheath portions toward said solid insulating means, said clamping means including conductive extensions of said sheath portions within the cable, conductive means within the cable sheath for drawing said conductive extensions toward one another, and unexposed solid insulation encased within the cable sheath and interposed between said conductive force-applying means and one of said conductive extensions.

References Cited in the file of this patent

UNITED STATES PATENTS

| | | |
|---|---|---|
| 291,731 | Hinds | Jan. 8, 1884 |
| 2,060,745 | Pettee | Nov. 10, 1936 |